E. B. TRAFTON.
MOTOR VEHICLE WHEEL.
APPLICATION FILED JAN. 15, 1919.
1,386,449.
Patented Aug. 2, 1921.
2 SHEETS—SHEET 1.
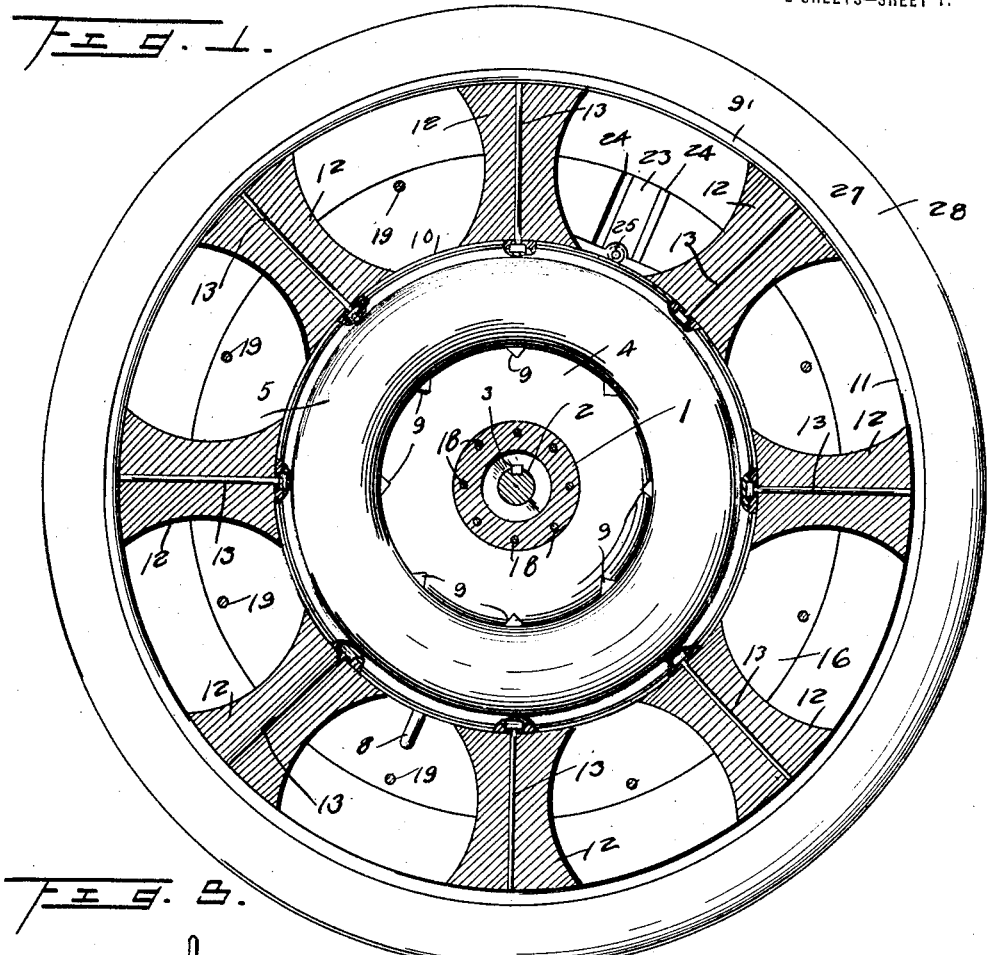
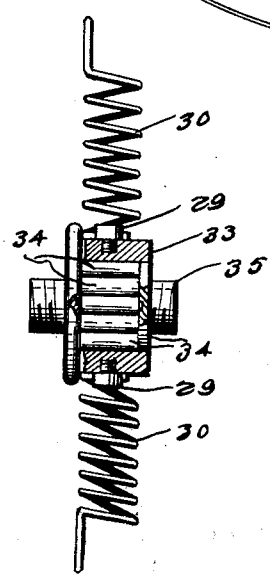
Inventor.
E. B. Trafton.
By _____, Attorney.

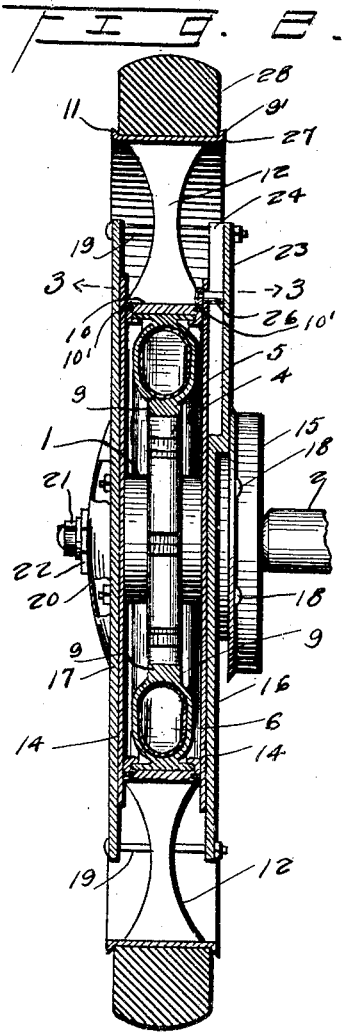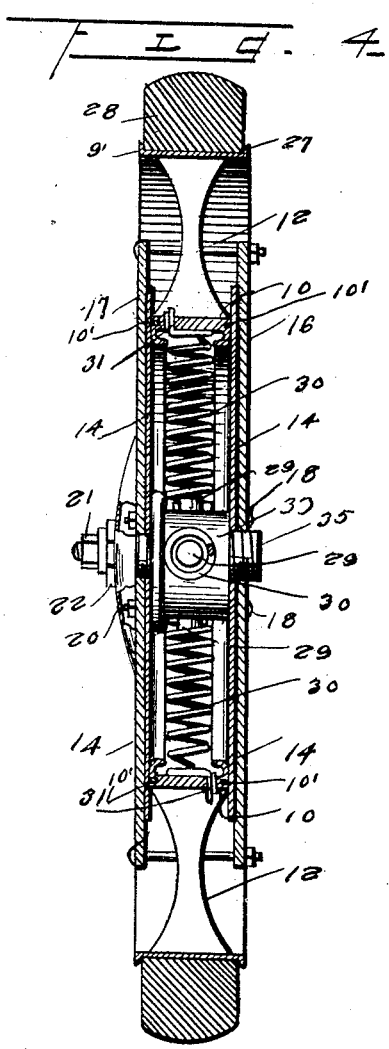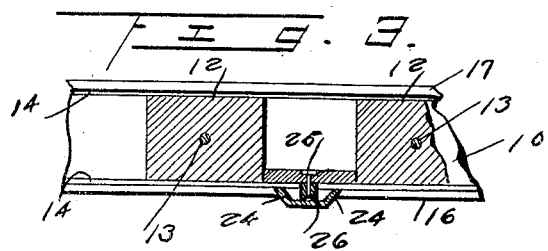

UNITED STATES PATENT OFFICE.

EDWIN B. TRAFTON, OF LEAVENWORTH, KANSAS.

MOTOR-VEHICLE WHEEL.

1,386,449. Specification of Letters Patent. Patented Aug. 2, 1921.

Application filed January 15, 1919. Serial No. 271,272.

*To all whom it may concern:*

Be it known that I, EDWIN B. TRAFTON, a citizen of the United States, residing at Leavenworth, in the county of Leavenworth and State of Kansas, have invented certain new and useful Improvements in Motor-Vehicle Wheels; and I do hereby declare the following to be a full, clear, and exact description of the invention, such as will enable others skilled in the art to which it appertains to make and use the same.

This invention relates to improvements in motor vehicle wheels and has for one of its objects the provision of means whereby the use of pneumatic tires is obviated, thereby reducing the expense caused by blow-outs, puncture, etc., and also the annoyance and time required to make necessary repairs to said tires when on the road.

Another object of this invention is the provision of a wheel structure having a floating hub so that solid tires can be employed and the hub will absorb all shocks and jars so as to produce a much smoother riding device over that of pneumatic tires and that will have great durability and one capable of withstanding excessive strain caused by skidding.

A further object of this invention is the provision of means for establishing a driving connection between the hub and wheel structure so that the device can be used for rear drive wheels of a vehicle and which will permit the necessary radial and circumferential movement of the wheel structure in relation to the hub.

A further object of this invention is the provision of means whereby the hub is capable of being cushioned either by pneumatic or spring construction.

A still further object of this invention is the provision of a motor vehicle wheel of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view of a motor vehicle wheel constructed in accordance with my invention, Fig. 2 is a sectional view taken on the line 2—2 of Fig. 1, Fig. 3 is a detail sectional view taken on the line 3—3 of Fig. 2 illustrating the driving connection between the wheel structure and hub, Fig. 4 is a view similar to Fig. 2 illustrating a modified form of my invention wherein the pneumatic cushioning means is replaced by springs.

Fig. 5 is a detail sectional view of the hub used on front wheels of motor vehicles.

Referring in detail to the drawings, the numeral 1 indicates a hub having a bore to receive the rear axle 2 of a motor vehicle and which is driven in the usual manner by the power source of the vehicle. The hub 1 is splined to the axle as illustrated at 3 and has mounted about its outer face at a point intermediate its ends an annular flange or member 4 adapted to bear against a pneumatic cushioning member 5. The pneumatic cushioning member 5 consists of an outer casing constructed from any material suitable for the purpose and has located therein a tube 6 provided with an inflating valve 8.

The shoe or casing has formed thereon spaced lugs 9 that engage in grooves formed in the annular member 4 to prevent the casing or shoe from having circumferential movement in relation to the annular member 4 of the hub.

A wheel structure 9' consists of an inner rim 10 and an outer rim 11, rigidly connected by spokes 12. The spokes 12 may be constructed of any material suitable for the purpose and have passing therethrough rods or bolts 13 which have their ends secured to the inner and outer rims, thereby providing a rigid wheel structure and one of great durability and strength. The inner rim is provided with inwardly directed flanges between which is received a shoe or casing 5, so that the wheel structure is cushionly supported upon the hub or the hub is capable of having a floating action owing to the pneumatic cushioning means between the same and the wheel structure. A pair of disks 14 are mounted upon the hub 1 and frictionally engage the flanges formed upon the inner rim 10 and project beyond said rim, so that dust and foreign matter is prevented from entering or coming in contact with the cushioning means, but will still permit the disks and hub to have a full floating action during the operation or use of the device. The inner rim 10 is provided with recesses in which are positioned gaskets 10' that engage the plates 14. The hub 1 has secured thereto a brake drum 15 of any well known construction. Plates 16 and 17 are mounted upon the hub and secured thereto by means of bolts 18 that extend through the hub and the brake drum causing said plates to move in unison with the hub. The bolts 18 also secure the brake drum to the hub. The plates 16 and 17 are of such a size that they project beyond the inner rim 10 and are connected together at their outer edges by means of bolts 19 that pass between the spokes 12. A plate 20 is located on the outer end of the axle and bears against the plate 17 and is held in place by a washer 22 and nut 21 that are threaded to the axle. The plate 20 overlies the outer ends of the bolts 18.

The plate 16 has an offset portion on its inner face forming a radial slot 23 which has its walls slightly inclined as illustrated at 24. A pin 25 is secured to the wheel structure 9 adjacent the inner rim 10 and has journaled thereon a friction roller 26 which is disposed within the slot 23. The size of the slot 23 is considerably larger than the circumference of the roller so that the wheel structure 9' may have circumferential movement as well as radial movement in relation to the hub when engaged by an obstacle, so that a cushioning effect will be had between the hub and the wheel structure 9' owing to the cushioning means 5. It will be seen that the plate 16 being secured to the hub and the hub secured to the axle, that on rotation of the axle the plate 16 will be rotated and one wall of the slot 23 thereof will engage the roller thereby establishing a driving connection between the hub and the wheel structure 9.

The outer rim 11 is provided with any type of tire engaging flanges 27 so that a solid tire 28 can be secured thereon.

Referring to my modified form of invention, wherein springs are substituted for the pneumatic means, the hub has formed thereon projections 29 having openings to receive the inner ends of coil springs 30. The outer ends of the springs 30 are inserted through openings in the inner rim 10, and held therein by wedges 31, so that the hub will be supported within the inner rim by the springs and which will absorb all shocks and jars to the device when passing over uneven ground.

When using my device on the front wheels of the motor vehicle, the driving connection between the hub and the wheel structure is dispensed with; that is, the slot 24 and pin 25 are eliminated and the hub 33 is provided with a bore in which are mounted roller bearings 34 that are adapted to support the hub upon the front axle 35 and which permit the hub to rotate about the axle with a minimum amount of friction.

While I have shown and described the preferred embodiment of my invention, it will be understood that minor changes in construction, combination, and arrangement of parts may be made without departing from the spirit and scope of the invention as claimed.

Having thus described my invention, what I claim is:—

A wheel having a plate rigid with the hub, a rim movable axially of the hub, cushioning means intermediate the hub and rim, a plate movable with the rim in contact with the first plate, one of said plates having an offset providing an elongated substantially radially disposed groove with the side walls thereof inclined, a projection on the other plate extending into the groove, means to cushion engagement of the projection with said walls, and said groove being enlarged relatively to the projection to permit axial movement of one plate relatively to the other plate to a limited extent incidental to shocks.

In testimony whereof I affix my signature in presence of two witnesses.

EDWIN B. TRAFTON.

Witnesses:
 Geo. W. Bright,
 L. S. Strasse.